*J. Forrest,*
*Sugar Crusher.*
N° 32,282. Patented May 14, 1861.
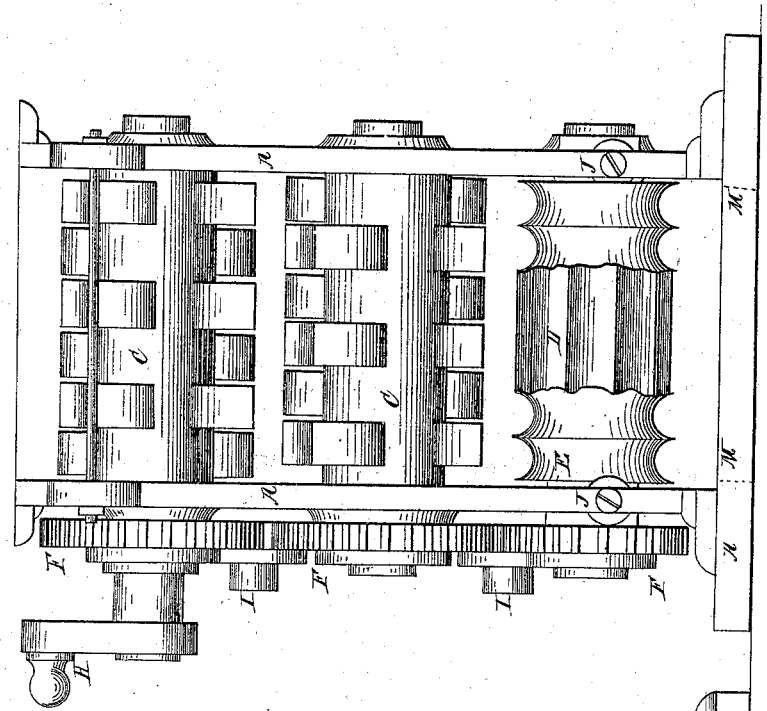
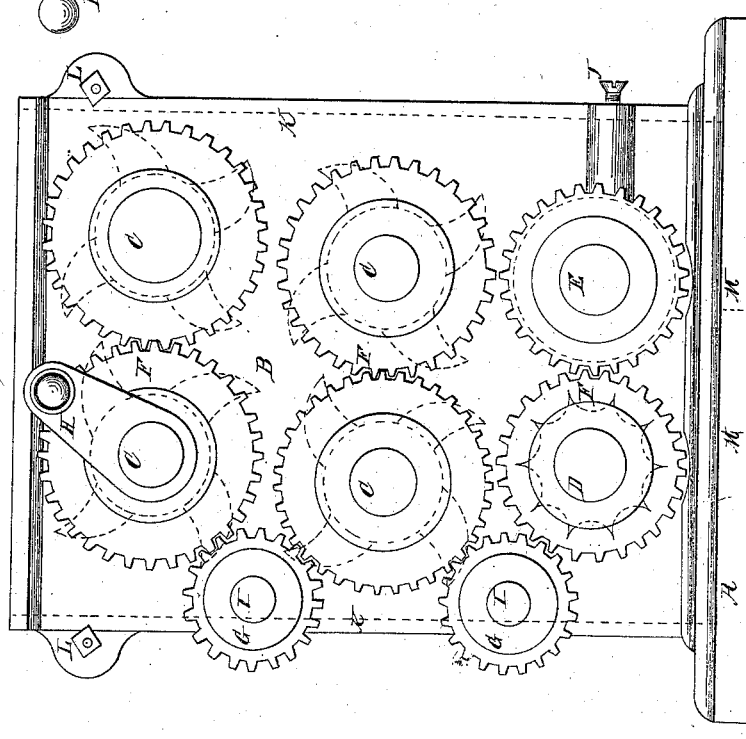

UNITED STATES PATENT OFFICE.

JOSEPH FORREST, OF NEW YORK, N. Y.

IMPROVEMENT IN MACHINES FOR BREAKING SUGAR.

Specification forming part of Letters Patent No. 32,282, dated May 14, 1861.

*To all whom it may concern:*

Be it known that I, JOSEPH FORREST, of the city, county, and State of New York, have invented certain new and useful Improvements in Mills for Breaking or Crushing Sugar or other Articles; and I do hereby declare that the same are described and represented in the the following specification and accompanying drawings.

The nature of my invention and improvements in mills for breaking and crushing sugar and other substances consists in the employment of a roller grooved lengthwise on its periphery in connection with a roller grooved roundwise or circumferentially on its periphery, and so operated as to break or crush the sugar or other substance; also, in connection with the above a pair of rollers armed with teeth, and operated so as to prepare the sugar or substances to be broken for the grooved rollers.

To enable others skilled in the art to make and use the improvements which I have invented, I will proceed to describe their construction and operation, refering to the before-mentioned drawings, in which the same letters refer to like parts in each of the figures.

Figure 1 is an end elevation of a machine with my improvements. Fig. 2 is a side elevation of the same with a portion of the roller which is grooved roundwise omitted to show a part of the roller grooved lengthwise.

In these drawings, A is a base to which the stands B B are fastened by bolts or otherwise, which stands may be made in the form shown, or in such other form as will answer the purpose, and they are perforated for the journals of the rollers C, C, D, and E, which extend through the stands, and have the gears F F fastened to them, which gears mesh together, as shown in Fig. 1, so as to make each pair of rollers turn in concert in the direction indicated by the arrows to crush sugar or break it as it passes through between the rollers and down through the machine. The gears F F are connected together by the stud-gears G G, as shown in Fig. 1, which mesh into them, and the journal of one of the rollers C may have a gear, pulley, or crank, H, fastened to it to turn it and operate the machine. The gears G G turn on the shaft-studs I I, fastened in the stand B for that purpose. The rollers C C are armed with teeth, as shown in Fig. 2 and by dotted lines in Fig. 1. The roller D is fluted lengthwise, as shown in Fig. 2 and by dotted lines in Fig. 1. The roller E, which is opposite to D horizontally, is fluted roundwise, as shown in Fig. 2 of the drawings. The boxes of the roller E may be traversed by the screws J J, so as to move the roller E toward D, and make the rollers break the sugar finer. The stands B B are grooved to receive the edges of the casings K K, (shown by dotted lines in Fig. 1,) and the stands are connected at the top by the rods L L; and the base A has a hole through it, (shown by the dotted lines M M,) for the sugar to fall through after it is broken by the rollers. The machine is set in motion and the loaves of sugar either whole or broken in a few pieces is put on the rollers which break it, and it falls from one pair of rollers to the next below until it escapes through the hole in the base A.

I believe I have described and represented my improvements in machines for breaking and crushing sugar and other substances, so as to enable any person skilled in the art to make and use them. I will now state what I desire to secure by Letters Patent, to wit:

The combination of two grooved rollers, D and E, working together, one of which is grooved lengthwise, the other circumferentially on its periphery, and one or more pairs of rollers armed with teeth, the whole arranged substantially as and for the purpose set forth.

JOSEPH FORREST. [L. S.]

Witnesses:
 JOHN RITTER,
 AUGUSTUS LELAND.